United States Patent [19]
Neuman

[11] 3,825,123
[45] July 23, 1974

[54] INJECTION MOLDING FILTER
[75] Inventor: Gordon E. Neuman, Coon Rapids, Minn.
[73] Assignee: A-1 Engineering, Inc., Osseo, Minn.
[22] Filed: Aug. 10, 1972
[21] Appl. No.: 279,680

[52] U.S. Cl............. 210/232, 55/242, 55/282, 55/410, 209/273, 209/398, 210/DIG. 15, 210/446, 210/497
[51] Int. Cl............................................. B01d 25/16
[58] Field of Search........... 210/446, 448, 451, 479, 210/480, 497.1, 497, 232; 209/273, 398; 55/242, 282, 410

[56] References Cited
UNITED STATES PATENTS

| | | | |
|---|---|---|---|
| 1,335,899 | 4/1920 | Kohlenberg | 210/446 |
| 1,802,423 | 4/1931 | Hemmingsen | 210/446 |
| 3,200,952 | 8/1965 | Jardin | 210/497.1 X |
| 3,317,043 | 5/1967 | Vanderpoel | 210/232 X |
| 3,397,794 | 8/1968 | Toth et al. | 210/446 X |
| 3,513,982 | 5/1970 | Carter et al. | 210/232 X |

FOREIGN PATENTS OR APPLICATIONS
846,457  8/1960  Great Britain ...... 210/497.1

OTHER PUBLICATIONS
Polypropylene, Theodore O. J. Kresser, p. 106, Reinhold Publishing Corp., New York, 1960.

Primary Examiner—Theodore A. Granger
Attorney, Agent, or Firm—Merchant, Gould, Smith & Edell

[57] ABSTRACT

Apparatus for filtering hot running plastic in an injection molding process. The filtering apparatus includes a housing defining a chamber with an inlet and outlet. A thick walled tubular member is disposed in the chamber to define concentric fluid passages respectively communicating with the inlet and outlet. The tubular member has a plurality of elongated openings formed therethrough in parallel, spaced relation which establish fluid communication between the concentric passages. A plurality of removable insert bars are disposed in the outer concentric passage and held in place between the chamber wall and the tubular member. Each insert bar cooperates with an elongated opening to define therewith a plurality of slotted filter passages through which the plastic is forced before injection into a mold.

19 Claims, 9 Drawing Figures

INJECTION MOLDING FILTER

The invention is related generally to filtering apparatus, and is specifically directed to devices for filtering melted plastic in an injection molding process.

As in many other fluid handling processes, filtration is an extremely important step in the injection molding of parts to insure continuous operation of the process as well as to maintain uniform high quality of the parts produced. The filtration of hot plastic, however, poses difficult and unique problems due to its relatively high melting point, which is approximately 475° Fahrenheit, and also by reason of its highly viscous state when melted. It will be appreciated that, when melted, plastic must flow continuously or it will tend to harden before entry into the mold. Filtration of the plastic is somewhat adverse to smooth flow since it involves relatively severe restriction to remove all undesirable particles. To insure continuous flow, the melted plastic must be subjected to extremely high pressures to accomplish proper injection, usually on the order of 50,000 pounds per square inch or more. In many injection molding machines, this pressure is diminished immediately after the injection of plastic into the mold and rapidly builds up during the next injection cycle. Needless to say, this gives rise to tremendous forces on the filtering structure, and the problem is compounded by repeated and significant fluctuations in pressure. The filtering device must, therefore, be made commensurately strong while retaining the ability to effectively filter melted plastic over thousands of injection cycles without breakdown and concomitant crippling of the entire process.

One form of filtering device presently used consists of a housing forming a cylindrical chamber with an inlet and an outlet. A tubular filtration member is disposed in the housing to define concentric fluid passages respectively communicating with the inlet and outlet in such a way that plastic follows a longitudinal path into the tubular member, turns abruptly to flow radially outward through the filter openings and resumes flow in the longitudinal direction as it passes through the outlet into the injection nozzle. One difficulty with this structural configuration arises from the abrupt changes of direction which the flow of plastic is required to make. I have found that by providing slotted filter openings which likewise extend in the longitudinal direction, these discontinuities or changes in flow of the plastic can be smoothed out significantly without adversely affecting filtration capability of the device. In other words, the longitudinal dimension of the filtering passages is extended while the passage width contains the desired filtering dimension. Thus, any particle which is greater in size than the filtering dimension cannot pass through the passage, notwithstanding the passage length.

Although this structural configuration enhances plastic flow through the filtering device, thereby reducing the pressure drop across the filtering region and also accomplishes the requisite filtration, I have also found that it is extremely difficult to form the slotted passages in a tubular filtration member having a wall thickness sufficient to withstand the extreme pressures involved. My invention, therefore, contemplates not only the provision of slotted passageways in a filtering apparatus, but also a specific structural approach to the successful formation of such filter passages.

This is accomplished through the cooperative engagement of at least two structural members neither of which is difficult to manufacture. I provide a thick walled tubular member in the housing chamber as with prior art devices; but, rather than placing the filter passages in the tubular member, it is formed with a plurality of relatively large, elongated openings in spaced, parallel fashion which are themselves incapable of performing a filtering function. Each elongated opening has an insert bar disposed in the outer concentric passage of the chamber and held in place by the chamber wall. A portion of the insert bar is disposed in the elongated opening, and cooperatively engages the opening wall to define a plurality of slotted filter passages. These cooperating members are so constructed that the filter passage diverges in the outward radial direction to insure that all material passing through the narrowest portion of the slot will leave the passage and not become lodged therein.

The insert bars are radially arranged with respect to the tubular carrier, and the entire assembly slides into the cylindrical chamber and is held in place by a threaded cap in which the outlet is formed. It will be appreciated from this construction that the filtration size is easily changed through simple removal of the existing insert bars and replacement with bars of a different size. The filter device is easily disassembled for purposes of cleaning and maintenance, and the elimination of low tolerance parts which are difficult to produce diminishes the manufacturing cost.

Further, in addition to providing smooth, continuous flow by reason of the elongated filter passages, the inventive filtering device provides uniform heating throughout the melted plastic by reason of contact of each insert bar with the outer container or housing. This further reduces the possibility of hardening of the plastic due to temperature gradients existing within the filter.

My invention further contemplates a dispersion chamber which insures that the melted plastic will be homogeneous at the time it is injected into the mold. This is particularly important when artificial coloring is added to the plastic at the time it is melted. Failure to fully mix plastic with the coloring agent often results in unsightly streaking within the end product. The dispersion chamber is optionally usable with the inventive filtering device and insures thorough mixing of the plastic without complicated structure.

DESCRIPTION OF THE PREFERRED EMBODIMENT

Figure 1:
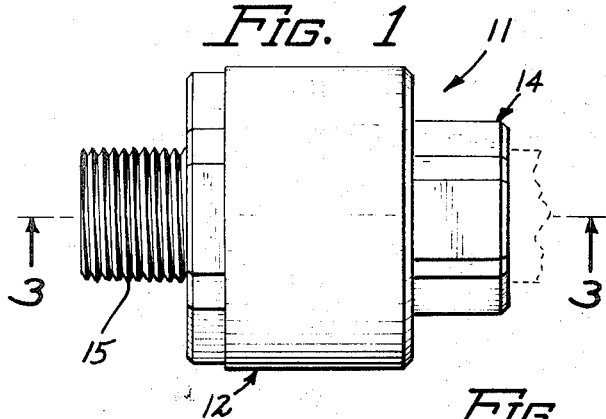
FIG. 1 is a view in side elevation of a filtering device embodying the inventive principle.
Figure 2:
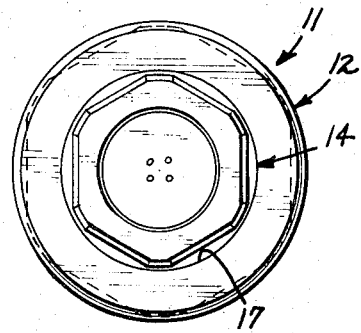
FIG. 2 is an end view of the filtering device as seen from right to left of FIG. 1.
Figure 3:
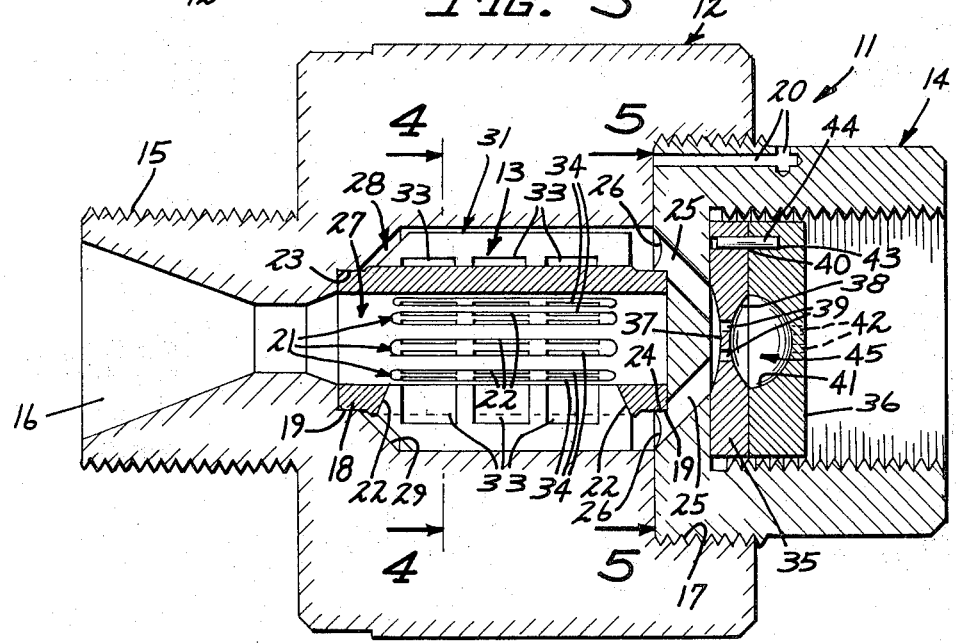
FIG. 3 is an enlarged sectional view of the filtering device taken along the line 3—3 of FIG. 1.
Figure 8:
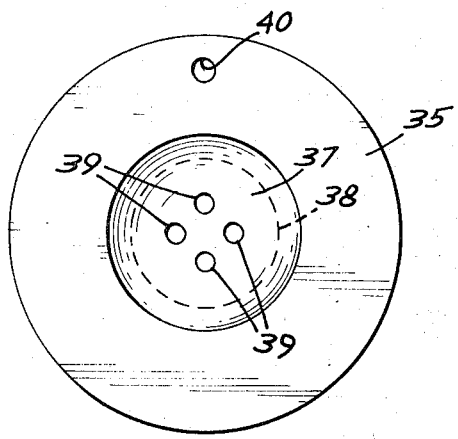
FIGS. 8 and 9 are separate views in top plan of first and second disc members which together define a dispersion chamber for the filtering device.
Figure 9:
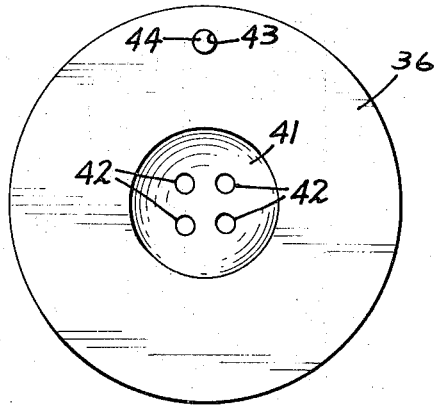

With initial reference to FIGS. 1–3, a filtering device specifically intended for use in an injection molding process is represented generally by the numeral 11. Device 11 broadly consists of a housing 12, which is cylindrical in shape and has a generally cylindrical chamber formed therein, a filter assembly 13 disposed within the cylindrical chamber and an end cap 14 which holds the filter assembly 13 in place.

Housing 12 is generally cylindrical in shape and defines a threaded projection 15 adapted for connection with a source of melted plastic under high pressure. Projection 15 has formed therein an inlet 16 for the melted plastic which converges toward and communicates with the aforementioned cylindrical chamber. The cylindrical chamber opens at the opposite end into a threaded receptacle 17 which receives end cap 14. End cap 14 defines an outlet for the cylindrical chamber and also retains the filter assembly 13 in place, as discussed below. A leak passage 20 formed in the end cap 14 communicates with the annular seat at the base of threaded receptacle 17 and opens at an exterior point. As positioned, passage 20 is capable of receiving and conducting plastic which may leak between the end cap 14 and housing 12 due to the extremely high operational pressures, thereby precluding pressure buildup at an undesirable area.

Figure 6:
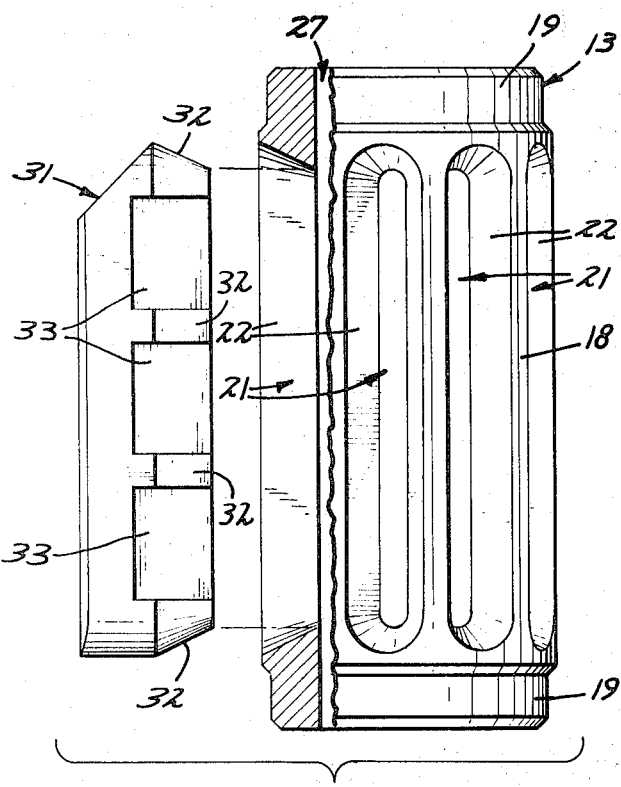
FIG. 6 is an enlarged, exploded view in side elevation of a cylindrical carrier and one insert bar associated therewith, which together define filtration passages for the device, portions thereof being broken away and shown in section.
Figure 7:
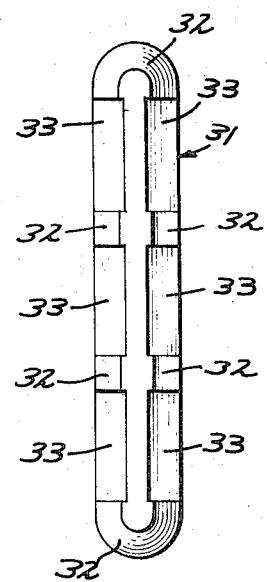
FIG. 7 is an edge view of one of the insert bars.

With additional reference to FIGS. 6 and 7, filter assembly 13 comprises a thick walled tubular member 18 with stepped end portions 19 as shown. A plurality of elongated openings 21 are disposed in parallel relation within tubular member 18 and extend entirely through its thick wall. Nine such openings 21 are included, and they are equiangularly spaced at 40° intervals. As best shown in FIG. 6, each of the openings 21 has beveled sides 22 which diverge in the radially outward direction.

With reference to FIG. 3, the cylindrical chamber of housing 12 has an annular groove 23 near the inlet 16 which receives one of the stepped ends 19 of tubular member 18. A similar groove 24 is formed in the end cap 14 to receive the opposite stepped end 19, thus affording a secure position for the tubular member 18 with end cap 14 screwed into the receptacle 17.

Figure 5:
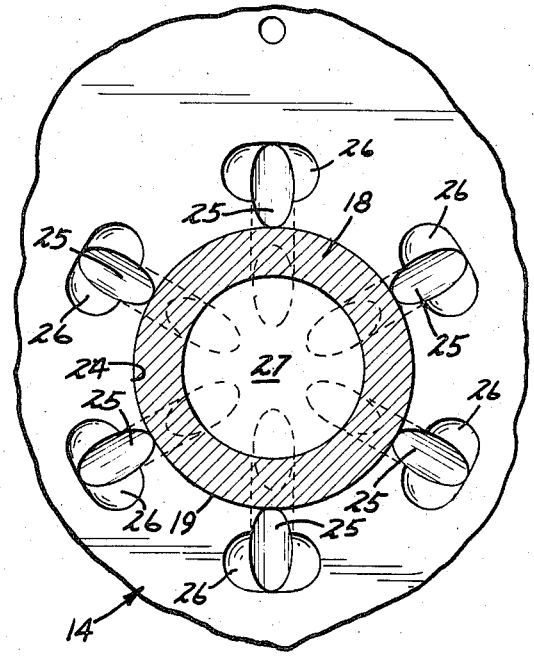
FIG. 5 is a sectional view of the filtering device taken along the line 5—5 of FIG. 3.

As shown in FIGS. 3 and 5, end cap 14 has a plurality of converging passages 25 extending through its frontal engagement face which define an outlet for the cylindrical chamber. The entrance of each of the passages 25 is formed with an elongated concave recess 26 which assists in channeling the plastic to the entrance end of the passages 25.

As described, the tubular member 18 is so disposed in the cylindrical chamber of housing 12 that it defines a first passage 27 within the member 18 and communicating with the inlet 16 and a second passage 28 which is concentric with the first passage 27 and communicates with the outlet passages 25. The several elongated openings 21 in the tubular member 18 establish communication between the first passage 27 and the second passage 28.

As best shown in FIG. 3, the second passage 28 begins with a beveled portion 29 adjacent the annular groove 23 and terminates in the converging passages 25. The angular disposition of both the beveled portion 29 and passages 25 is preferably 45° with respect to the longitudinal axis of the device 11. I have found that angularly forming the ends of chamber 28 in this manner better distributes the forces generated by pressure of the plastic through the housing 12, thus providing a structure which is inherently stronger and safer.

Figure 4:
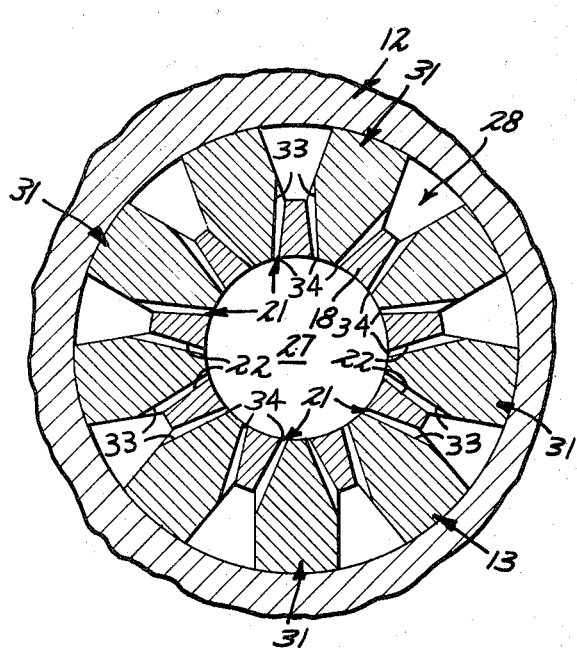
FIG. 4 is a sectional view of the filtering device taken along the line 4—4 of FIG. 3.

With specific reference to FIGS. 3, 4, 6 and 7, filter assembly 13 further comprises a plurality of insert bars 31 corresponding in number to the elongated openings 21 of tubular member 18. Each of the insert bars 31 has a frontal engagement surface or land 32 which cooperates with the beveled side 22 of each elongated opening 21. The radial dimension of each insert bar 31 (i.e., its width as viewed in FIG. 6) corresponds to the radial distance between the inner surface of tubular member 18 and the inner surface of the cylindrical chamber. Further, as best shown in FIG. 4, the outermost surface of each insert bar is convexly formed, based on the radius of the cylindrical chamber, so that the entire filter assembly 13 is tightly retained within the cylindrical chamber walls when inserted therein. It will be appreciated that this structural configuration permits the entire filter assembly 13 to be removed from the cylindrical chamber simply by unscrewing the end cap 14; and each of the insert bars 31 is likewise easily removed from the tubular member 18 when the assembly 13 is withdrawn from the cylindrical chamber.

With continued reference to FIGS. 4, 6 and 7, each of the insert bars 31 has six planar faces 33 formed therein which are arranged in opposed pairs and cut entirely through the doubled face 32. As best shown in FIG. 7, these planar surfaces 33 cut into the extreme inner face of the bar 31 so that, upon insertion of the bar 31 into an associated elongated opening 21, elongated filtration openings 34 are defined between the respective beveled surfaces 22 and 32 (FIG. 4). As will also be apparent in FIG. 4, these planar surfaces 33 diverge at a slightly lesser angle than the associated beveled surface 32 so that the elongated filtration opening increases in cross-sectional area from the point of communication with the first or inner passage 27 to the point of communication with the second or outer passage 28. This structural configuration insures that whatever material passes through the filtration opening 34 at its narrowest point will pass entirely through the passage without becoming clogged or lodged therein. It will also be appreciated that, although any material greater in size than the narrowest dimension of openings 34 will be precluded from passing therethrough, the fact that each opening 34 is elongated in the direction of flow and longitudinally aligned with the other openings 34 gives rise to excellent continuity of flow since abrupt changes in flow direction are not necessary. Further, the combined cross-sectional area of the several filtration openings 34 is substantial by reason of the elongated configuration; and the volume flow therethrough is therefore substantial, thereby performing improved filtration without creating a severe pressure drop as in previous devices.

With reference to FIGS. 2, 3, 8 and 9, filtering device 11 further comprises first and second circular plate 35, 36, respectively, the diameter of which is sized for insertion into the threaded outlet of end cap 14 (FIG. 3). Circular plate 35 has a shallow concave recess 37 centrally disposed on one face thereof which commonly communicates with outlet passages 25. A deeper concave recess 38 is formed on the opposite face of plate 35 and communicates with the recess 37 through four spaced bores 39. Circular plate 35 further comprises a registration hole 40, and it will be observed that the bores 39 are arranged in a square configuration which is corner-to-corner relative to the registration hole 40.

Circular plate 36 has a deep concave recess 41 and a plurality of bores 42 also arranged in the square configuration. Circular plate 36 includes a similar registration hole 43 relative to which the bores 42 are arranged side-to-side. A registration pin 44 is commonly inserted into the registration holes 40 and 43 so that the bores 39 and 42 are out of alignment relative to the flow axis of device 11. Circular plates 35 and 36 are held in place with a suitable threaded member which may consist of a nozzle or connecting conduit and is represented by phantom lines in FIG. 1. As constructed and assembled, the circular plates 35 and 36 together define a dispersion chamber 45 (FIG. 3) which, by reason of the non-alignment of bores 39 and 42, causes the hot filtered plastic to mix thoroughly in vortex fashion before injection into the mold. I have found that this structural configuration prevents streaking of molded products where artificial coloring is added to the plastic at the time it is melted. Ordinarily, the artificial coloring is not mixed sufficiently with the plastic before injection and streaking results within the molded product. The vortex flow within dispersion chamber 45 causes ample mixture of the plastic and artificial coloring before injection and insures uniform coloring throughout the resulting product.

I claim:
1. Filtering apparatus comprising:
   a. a housing defining a chamber with an inlet and an outlet;
   b. a tubular member removably disposed in the chamber and defining a first fluid passage communicating with said inlet and a second fluid passage communicating with said outlet, the tubular member having a plurality of wall openings each of which establishes communication between the first and second fluid passages;
   c. and an insert member for each opening and cooperable with the opening to define at least one filtering passage therewith, each insert member being removeably retained by the tubular member and the inner wall of the chamber.

2. The apparatus defined by claim 1, wherein the chamber is cylindrical in shape, and the tubular member is circular in cross section and disposed so that the first and second fluid passages are concentrically arranged.

3. The apparatus defined by claim 2, wherein an outermost face of each insert member conforms to the inner cylindrical chamber wall.

4. The apparatus defined by claim 2, wherein said plurality of openings and insert members are radially arranged within the cylindrical chamber.

5. The apparatus defined by claim 1, wherein each wall opening of the tubular member is defined by a continuous wall, and each insert member defines a discontinuous wall mateably engageable with the continuous wall of the associated wall opening to define said filtering passage.

6. The apparatus defined by claim 5, wherein the continuous wall is beveled, diverging from the first passage to the second passage, and the insert member is mateably insertable into the beveled opening and retained therein by the chamber wall.

7. The apparatus defined by claim 6, wherein the insert member defines a continuous wall mateably engageable with the beveled opening of the insert member and a recess of predetermined size and shape in said wall to define a discontinuity thereof.

8. The apparatus defined by claim 7, wherein the recess is defined by a planar surface formed in the face of the continuous wall of the insert member and disposed to define an elongated filtration passage.

9. The apparatus defined by claim 8, wherein the planar surface diverges at a lesser angle between the first and second passages than the beveled wall of the associated opening to define a filtration passage which increases in cross-sectional area from the first fluid passage to the second fluid passage.

10. The apparatus defined by claim 8, wherein the wall openings and insert members are elongated, each insert member comprising a plurality of planar surfaces defining a plurality of elongated filtration passages.

11. The apparatus defined by claim 8, wherein each insert member comprises first and second elongated, parallel side walls, and a like number of planar surfaces are formed in each side wall, the planar surfaces being disposed in opposed pairs.

12. The apparatus defined by claim 11, wherein the elongated wall openings are disposed longitudinally of the tubular axis.

13. The apparatus defined by claim 1, wherein each of said insert members defines a filter passage having an elongated opening disposed essentially parallel with the axis of said tubular member.

14. The apparatus defined by claim 1, and further comprising:
   a. a dispersion chamber disposed between the second passage and said outlet and respectively communicating with each;
   b. and means for effecting a vortex-like flow of the filter fluid before it leaves said outlet.

15. The apparatus defined by claim 14, wherein the first chamber communicates with the second passage through a first plurality of spaced bores and with the outlet through a second plurality of spaced bores, the first and second plurality of spaced bores being disposed essentially parallel with the cylindrical chamber axis and in non-axial alignment with each other.

16. The apparatus defined by claim 1, wherein the housing defines an open-ended cylindrical chamber and a removable cap therefor, the tubular member being held in position by the cap.

17. The apparatus defined by claim 16, wherein the juncture of said removable cap with the chamber housing communicates with the chamber and further comprising a leak passage leading from said juncture at a point remote from the chamber to an external leakage opening.

18. Filtering apparatus comprising:
   a. a housing defining a chamber with an inlet and an outlet;
   b. a tubular member removably disposed in the chamber and defining a first fluid passage communicating with said inlet and a second fluid passage communicating with said outlet, the tubular member having at least one opening formed therethrough which establishes communication between the first and second passages, said wall opening being defined by a continuous wall;

c. and an insert member for the wall opening, the insert member having a discontinuous wall which mateably engages with the continuous wall of the opening to define a filtering passage therebetween.

19. The apparatus as defined by claim 18, wherein the continuous wall of the wall opening is beveled, diverging from the first passage to the second passage, and the insert member is mateably insertable into the beveled opening.

* * * * *